United States Patent [19]

Ramsay et al.

[11] 4,173,412
[45] Nov. 6, 1979

[54] STRAIN MEASUREMENT

[75] Inventors: Melvin M. Ramsay, Harlow; Stephen Wright, London, both of England

[73] Assignee: International Standard Electric Corporation, New York, N.Y.

[21] Appl. No.: 811,008

[22] Filed: Jun. 29, 1977

[30] Foreign Application Priority Data

Jul. 1, 1976 [GB] United Kingdom ............ 27438/76

[51] Int. Cl.$^2$ .......................... G01B 11/16; G01J 4/04
[52] U.S. Cl. ..................................... 356/33; 356/73.1
[58] Field of Search ................... 356/32–35, 356/114–117, 239, 365, 73.1; 73/88 A

[56] References Cited

FOREIGN PATENT DOCUMENTS 161547   7/1964   U.S.S.R. .................................. 356/32

OTHER PUBLICATIONS

Kapron et al., "Birefringence in Dielectric Optical Waveguides," IEEE Jr. Quantum Electronics QE-8, 2-1972, pp. 222-225.
Papp et al., "Polarization Optics of Index-Gradient Optical Waveguide Fibers," Applied Optics, vol. 14, 1975, pp. 2406-2411.
Dyott et al., "Group Delay in Glass-Fibre Waveguide," Electronics Lett. 2-1971, pp. 82-84.

Primary Examiner—John K. Corbin
Assistant Examiner—Wm. H. Punter
Attorney, Agent, or Firm—John T. O'Halloran; Peter C. Van Der Sluys; Stephen B. Goldman

[57] ABSTRACT

A strain sensor providing an optical read-out that is suitable for use in electrically noisy environment or one subject to mechanical vibration consists of one or a set of single mode optical fibres wound round an expanding strain member. The principle of operation relies upon the fact that transverse straining of a single mode fibre destroys mode degeneracy thereby producing birefringence effects that can be rendered obversable using polarized light and a polarization analyzer.

10 Claims, 8 Drawing Figures

STRAIN MEASUREMENT

BACKGROUND OF THE INVENTION

This invention relates to a method of measuring strain applied to one or more optical fibres. A particular application of the invention concerns the measurement of strain produced by pressure applied to a system, thus providing a method of measuring pressure.

A transducer for measuring strain or pressure that provides an optical output has the advantage that it is not disturbed by electromagnetic interference at other than optical frequencies. This is particularly desirable for making measurements in electromagnetically noisy environments such as at various points inside a jet engine. Moreover, for this sort of purpose, an optical signal is preferred to a fluidics signal, since the latter is vulnerable to the vibrations and accelerations present in such environments, and is less readily able to withstand the extreme temperature range over which operation may be required.

SUMMARY OF THE INVENTION

According to the present invention there is provided a method of measuring the magnitude of strain applied to one or more optical fibres of circular symmetry and identical construction, each of which fibres is uniformly strained over a portion of its length in a direction perpendicular to the fibre axis, wherein the magnitude of the applied strain is measured by monitoring with polarised light propagating through each fibre the strain induced difference in phase velocity of the two orthogonal fundamental modes of light propagating with a normalised frequency of less than 2.405 one mode having its polarisation direction aligned with the applied strain direction.

The invention also provides a strain sensor including a light source, an optical fibre of circular symmetry wrapped around a strain member such that expansion of the strain member strains the wrapped around portion of the fibre in a direction perpendicular to its axis, a beam splitter, a quater-waveplate, and a pair of photodetectors whose outputs are connected to a pair of threshold switching devices, wherein the light source is adapted to launch polarised light into one end the fibre to excite two orthogonal fundamental modes propagating with a normalised frequency of less than 2.405, one mode having its polarisation direction aligned with the strain direction, wherein the other end of the fibre is positioned with respect to the beam splitter to divide the light that has propagated therethrough into a pair of beams which are directed to the photodetectors each beam reaching its photodetector via a linear polarisation analyser whose polarisation direction is inclined at 45° to the fibre strain direction and wherein a single one of the beams reaches its analyser via a quater-waveplate oriented with its optic axis at 45° to the polarisation direction of the analyser.

The invention further provides a strain sensor including one or more light sources, a set of optical fibres of circular symmetry and identical construction wrapped around a strain member such that expansion of the strain member strains the wrapped around portion of each fibre of the set in a direction perpendicular to its axis, one or more linear polarisation analysers, and a set of photodetectors each of whose outputs is connected to the input of an associated one of a set of threshold switching devices, wherein the individual lengths of the wrapped around portions of the set of fibres are harmonically related such that the wrapped around length of each fibre is twice the wrapped around length of its predecessor in the set of fibres, wherein the light source or sources are adapted to launch polarised light into one end of each member of the set of fibres to excite two orthogonal fundamental modes propagating with a normalised frequency of less than 2.405, one mode having its polarisation direction aligned with the strain direction, and wherein the other end of each member of the set of fibres is positioned to direct light that has propagated therethrough to an associated one of the set of photodetectors via the, or one of the, linear polarisation analysers oriented with its polarisation direction at 45° to the fibre strain direction.

The invention also provides a strain sensor including one or more light sources, a set of optical fibres of circular symmetry and identical construction wrapped around a strain member such that expension of the strain member strains the wrapped around portion of each fibre of the set in a direction perpendicular to its axis, one or more beam splitters, one or more quarter-waveplates, one or more linear polarisation analysers, and a set of photodetectors each of whose outputs is connected to the input of an associated one of a set of threshold switching devices, wherein the individual lengths of the wrapped around portions of the set of fibres are harmonically related such that the wrapped around length of each fibre is four times the length of its predecessor in the set of fibres, wherein the light source or sources are adapted to launch polarised light into one end of each member of the set of fibres to excite two orthogonal fundamental modes propagating with a normalised frequency of less than 2.405, one mode having its polarisation direction aligned with the strain direction, wherein the other end of each member of the set of fibres to excite two orthogonal fundamental modes propagating with a normalised frequency of less than 2.405, one mode having its polarisation direction aligned with the strain direction, wherein the other end of each member of the set of fibres is positioned with respect to the, or one of the, beam splitters to divide light that has propagated therethrough into a pair of beams directed to an associated pair of members of the set of photodetectors each beam reaching its photodetector via the, or one of the, linear polarisation analysers which analyser is oriented with its polarisation direction at 45° to the fibre strain direction and wherein the quarter-waveplate or plates are disposed such that a single member of each pair of beams reaches its associated analyser via a quarter-waveplate oriented with its optic axis aligned at 45° to the polarisation direction of the analyser.

GENERAL DESCRIPTION OF THE INVENTION

For an understanding of the underlying principles of the invention it should be appreciated that while an optical fibre having circular symmetry used at a wavelength for which the normalised frequency is less than 2.405 is commonly designated as being operated in single mode, there are in fact two orthogonal plane polarised modes at this wavelength. These have identical propagation constants and normally are not individually distinguished from each other. An optical fibre with an eliptical cross-section similarly has a pair of fundamental modes. In this case however, the polarisation planes are aligned with the major and minor axes of the ellipse, and the normalised frequencies of the two modes are slightly different. Generally optical fibre waveguides are used with detector systems that are not polarisation sensitive, and interest centres on the modulation envelope imposed on light propagating in the fibre. This envelope is propagated at the group velocity, which does not change much with normalized frequency over the range from 2 to 2.405. It is for this reason that small eccentricities in optical fibre do not normally introduce objectionable distortion of modulation in so-called single mode fibre. On the other hand phase velocity is proportionately much more heavily dependent upon normalised frequency, and over the range from 2 to 2.405 varies approximately linearly with normalised frequency. Therefore if an optical fibre of circular symmetry is strained to produce an elliptical cross-section, the result of this strain will be to cause the two fundamental modes having planes of polarisation aligned with the axes of the ellipse to have phase velocities which differ by an amount dependent upon the magnitude of the strain. If polarised light is launched into the fibre in such a way as to excite both these fundamental modes, the presence of this phase velocity difference will affect the state of polarisation of the light emerging from the far end of the fibre. For instance if plane polarised light is launched into the fibre with its polarisation plane aligned at 45° to the ellipse axes, the fibre will convert the plane polarised light into circularly polarised light when the strain is such as to separate the two phase velocities by an amount giving a phase angle difference of 90°. (Similarly circularly polarised light would be converted to plane polarised light). If the strain is such as to give a phase angle difference of 180° then the fibre will change the plane of polarisation of initially plane polarised light through 90°. If the output is directed through a linear polarisation analyser whose polarisation axis is at 90° to the polarisation axis of the light initially launched into the fibre, then, as the strain is increased, the transmitted light intensity will pass through nulls each time the resulting phase difference is increased by 360°. Neglecting birefringence effects, the application of strain in a transverse direction will cause a small eccentricity in a fiber of circular symmetry that will produce, for a normalised frequency of about 2, a change in relative phase velocity that is approximately proportional to three times the proportional change in linear dimensions. In view of the shortness of the wavelength of light relatively large phase angle differences are generated over comparatively short lengths of fibre even when the strain is kept well beneath the elastic limit of a conventional glass optical fibre. Conversely, since optical fibre attenuations of less than 10 db/km are fairly readily available, maximum lengths of the strained fibre are only limited by practical considerations, and a high sensitivity can be obtained.

A measurement of strain can in principle be determined by launching into the fibre plane polarised light having its polarisation axis at 45° to the transverse strain direction, by observing the light output from the fibre through a linear polarisation analyser aligned at 45° to the strain direction, and by counting the nulls as the strain is monotonically increased from zero.

DESCRIPTION OF THE PREFERRED EMBODIMENT

Figure 1:
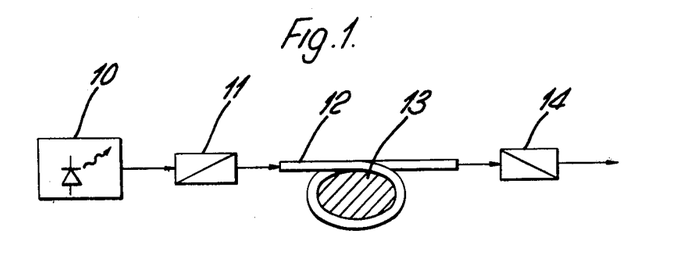
FIGS. 1 and 3 are schematic representations of single optical fibre strain sensors, according to the invention.
Figure 2:
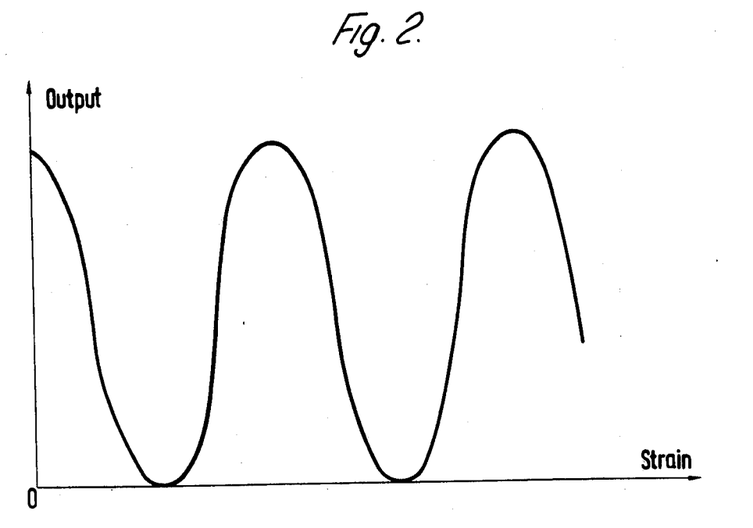
FIGS. 2 and 4 are graphic representations of the outputs of the sensors of FIGS. 1 and 3 plotted as a function of applied strain.

A pressure sensor based on this principle is depicted in FIG. 1. Light from a source 10 is directed through a linear polariser 11 on to one end of an optical fibre 12 of circular symmetry that is wrapped around a strain member 13. This may be a hollow vessel that expands when its interior is pressurised. Light emerging from the other end of the fibre is directed through a linear polarisation analyser 14. The wavelength of the light is such that all modes, other than the two fundamental modes, of the fibre are beyond cut off. The polarisation planes of the polariser 11 and the analyser 14 are both inclined at 45° to the direction in which the fibre is strained by the expansion of the strain member 13. The graph of FIG. 2 depicts how the light intensity output from the analyser 14 varies as a sinusoidal function of pressure. The separation between adjacent nulls is equal to the strain increment that changes the phase difference by 180°. The magnitude of an applied strain may be measured by increasing the strain monotonically from zero and counting the number of nulls that it produces. If the strain does not increase monotonically, an error is liable to be introduced because a null produced by decreasing the strain is not distinguishable in this system from a null produced by increasing the strain.

Figure 3:
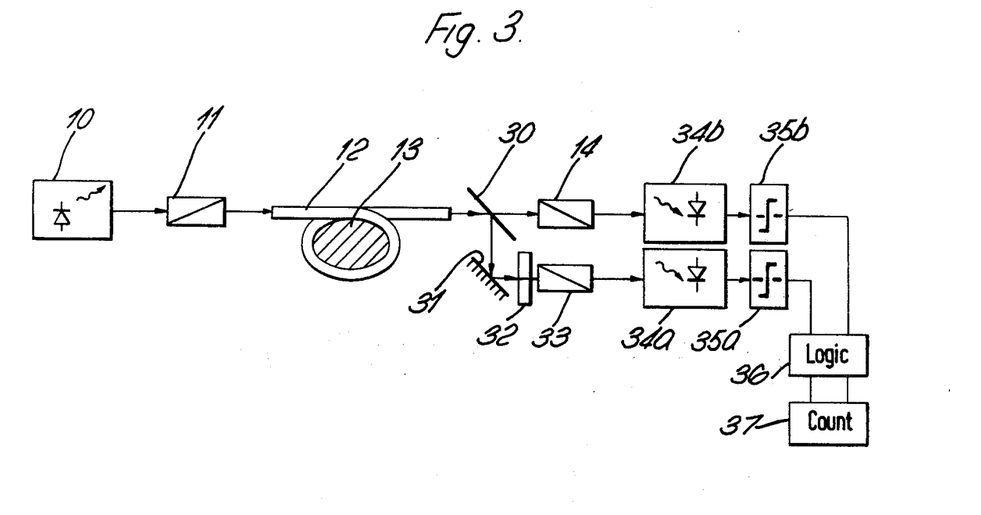
Figure 4:
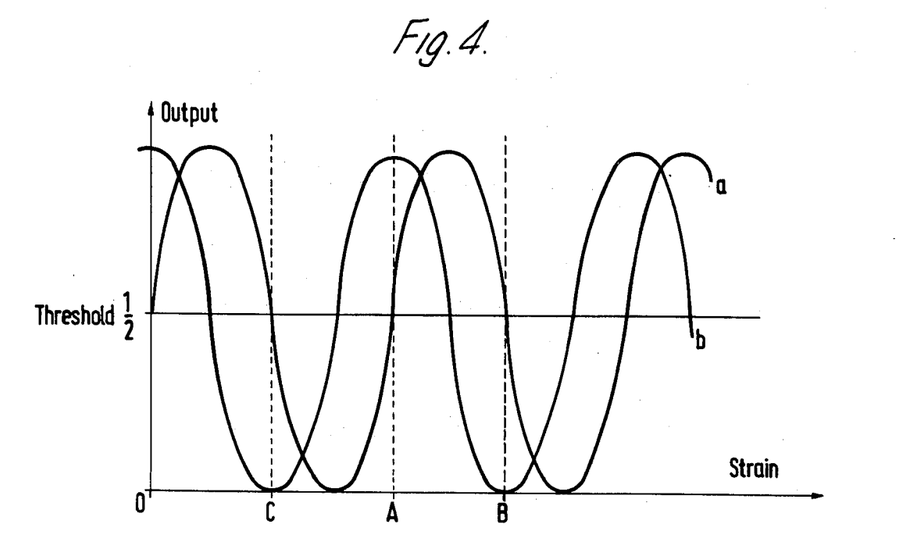

This problem can be surmounted by splitting the output beam from the fibre into two beams, one of which is passed directly to an analyser, and the other of which is passed through an appropriately oriented quarter-waveplate before being passed through its analyser. Such a system is depicted in FIG. 3 in which the components that are common to this system and the system of FIG. 1 are identified by the same index numerals in both Figures. The light beam emerging from the fibre is directed onto a beam splitter 30 which provides a second beam which is directed by a mirror 31 through a quarter-waveplate 32 and then through a second linear polarisation analyser 33. (The analysers 14 and 22 do not have to be entirely separate but may be different regions of a single device). The optic axis of the quarter-waveplate is aligned at 45° to the polarisation direction of the analyser 33, which is itself at 45° to the strain direction. The light intensity outputs from the two analysers both vary sinusoidally with applied strain as depicted in the graph of FIG. 4. The phase of the sinusoidal function produced at the second analyser is, however, shifted by 90° with respect to that at the first as a result of the action of the quarter-waveplate. (It may be noted that if circularly polarised light is launched into the fibre instead of appropriately oriented plane polarised light, the same sinusoidal outputs will be produced, but in this instance both will be shifted by 90°).

If the strain is increased from a value A to a value B, one of the outputs, output b from detector 34b, decreases from a maximum to a minimum. Exactly the same effect upon this output is produced if the strain were instead reduced from the value A to the value C.

The behaviour of the other output, output a, is different in the two instances. At A it is at a median value, and as the strain is increased to the value B, the output first rises to a maximum, and then reverts to a median value. If the strain is reduced from A to C the second output falls to a minimum before reverting to a median value.

Thus by observing the behaviour of both outputs it is possible to obtain a measurement of applied strain when that strain is increased from zero without the restriction that the increase be a monotonic one. Conveniently the observation is automated and involves directing the outputs on to two photodetectors 34a, 34b whose outputs are connected via threshold level switches 35a, 35b and associated logic circuitry 36 to a counter 37. This is arranged to change the stored count each time one of the outputs, say output a, passes through a median threshold value. If this output a is passing from low to high, and output b is high, the count is increased by one unit. This is the situation that occurs when the strain is increasing through the value A. The count is also increased by one unit when output a passes from high to low through the median threshold while output b is low. This is the situation that occurs when the strain is increasing through the value B or C. Conversely, if output a is passing from high to low through the median threshold value, and output b is high, the count is decreased by one unit. Similarly, if the output 31 is passing from low to high through the median threshold value and the other output is low, the count is also decreased by one unit.

The next sensor to be described employs a set of fibres, instead of just a single fibre, and this obviates the need for a counter, and hence precludes the possibility of measurements becoming contaminated by counting errors.

Figure 5:
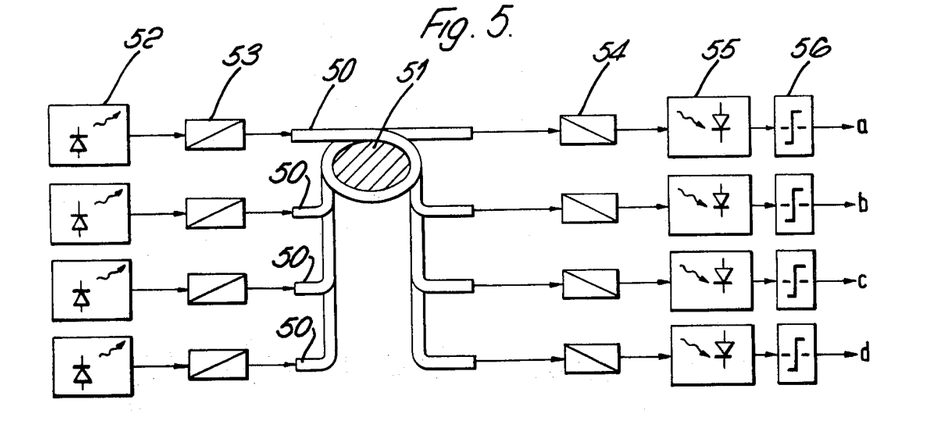
FIGS. 5 and 7 are schematic representations of alternative forms of multiple optical fibre strain sensors according to the invention.

Referring to FIG. 5, a set of optical fibres 50 of circular symmetry and identical construction are wrapped around a strain member 51 that, in the case of a pressure sensor, may be a hollow vessel that expands when its interior is pressurised. The first fibre of the set is wrapped around one or more turns the second twice as much, the third four times as much, and so on, each member being wrapped around for twice the distance of its immediate predecessor in the set. For the sake of simplicity a set of only four fibres has been shown. Light is launched into one end of each fibre 50 from an associated light source 52 via a linear polariser 53. The light emerging from the other end is directed via a linear polarisation analyser 54 to a photodetector 55. The polariser and analyser associated with each fibre 50 are both oriented so that their polarisation directions are inclined at 45° to the direction in which the fibre is strained by the expansion of the strain member 51. Although FIG. 5 depicts separate light sources for each fibre, and separate polarisers and analysers, the same light source can be used for launching light into all the fibres, and similarly the polarisers and analysers may be commoned. If a laser light source is used providing a linearly polarised output there will, of course, be no need for a separate polariser.

Figure 6:
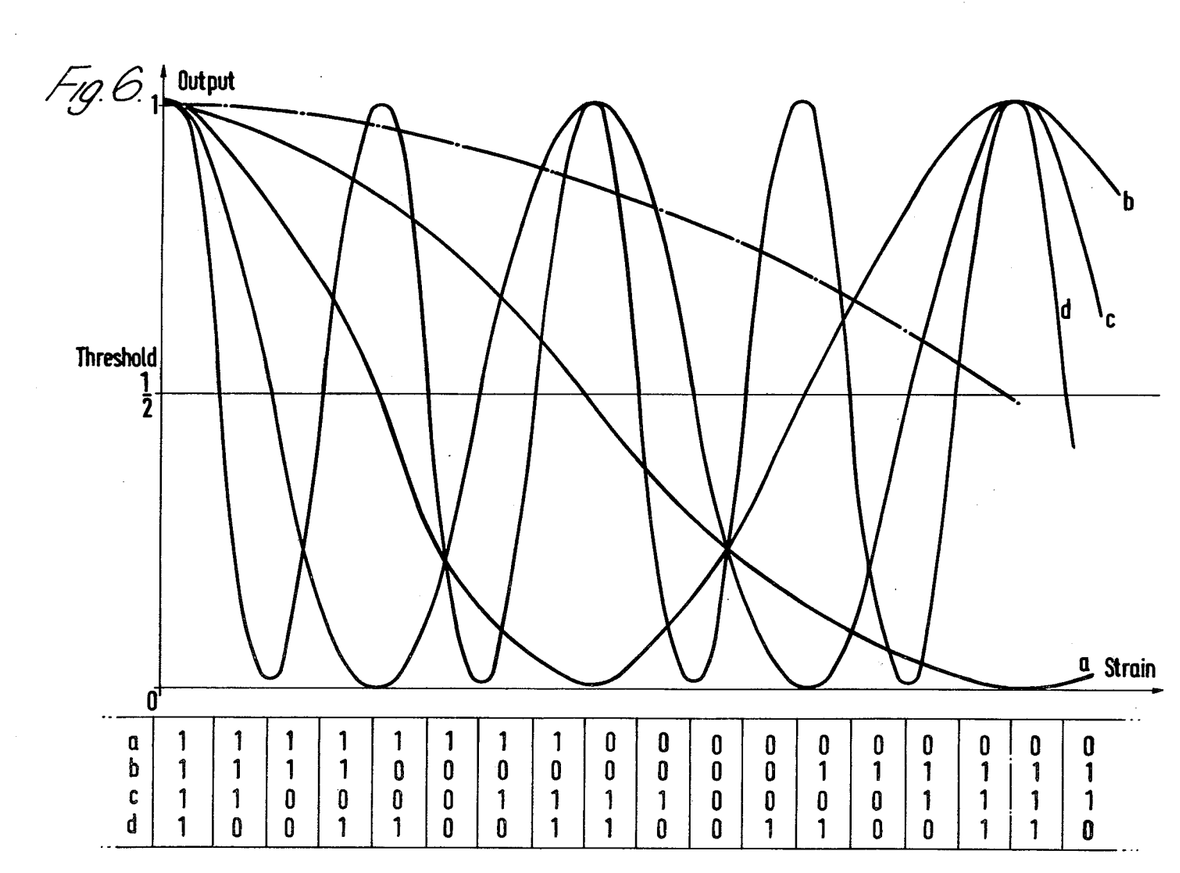
FIGS. 6 and 8 are graphic representations of both the analogue and the digital outputs of the sensors of FIGS. 5 and 7 plotted as a function of applied strain.

The output light intensity from the analyser associated with the fibre wrapped the least number of turns varies sinusoidally with applied strain, just like that from the analyser 14 of FIG. 1. The same type of sinusoidal output is produced by the analyser associated with the fibre that has twice the wrapped length, but since the strain is applied over twice the length, the sinusoid has half the pitch of the first. Similarly the sinusoid associated with the third fibre has a quarter of the pitch of the first. FIG. 6 depicts these sinusoids relating photodetector output to applied strain. Each photodetector output is taken to an associated threshold switching device 56 (FIG. 5), which is arranged to switch at the median value of the photodetector output. The outputs of the switching devices generate a binary code that is set out beneath the graph of FIG. 6. From this figure it will be seen that with applied strain the binary code for four fibres changes at regular intervals 16 times. The sixteenth code lasts twice as long, and then the sequence is repeated in reverse order. If, however, there were an extra fibre, its analyser would provide the sinusoidal signal depicted by the chain dotted curve. This would provide an additional binary digit that can be seen increases the basic sequence to 32 codes. Each successive fibre will double the length of the sequence enabling a digital read out of greater resolution while for simplicity of illustration only four fibres have been depicted in FIG. 5, in general a larger number will be used. Thus, for instance if 17 fibres are used it is possible to provide a measurement resolution of 1 to $10^5$.

Figure 7:
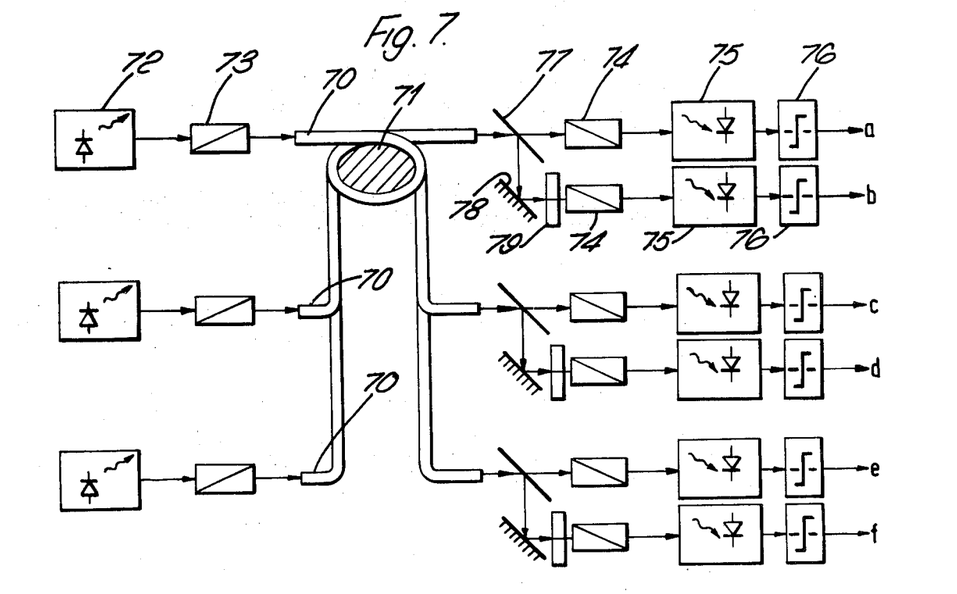

The same resolution in the digital read-out can be obtained with half the number of fibres by adopting the expedient used in the sensor of FIG. 7. In this sensor a set of optical fibres 70 of circular symmetry and identical construction are wrapped around a strain member 71, and in this case the wrapped length of each fibre is four times that of its predecessor in the set.

Each fibre is in an optical system like that of the arrangement described above with reference to FIG. 3. Light is launched into one end of each fibre from an associated light source 72 via a linear polariser 73. The light emerging from the other end is split into two beams by an associated beam splitter 77 and directed via a pair of linear polarisation analysers 74 to a pair of photodetectors 75. A mirror 78 reflects one of the beams so that the photodetectors can be mounted in a common plane. The polariser and analysers associated with each fibre are all oriented so that their polarisation directions are at 45° to the direction in which the fibre is strained by the expansion of the strain member 71. One member of each pair of analysers 74 is prefaced with a quarter-waveplate 79 having its optic axis at 45° to the polarisation direction of the analyser.

Figure 8:
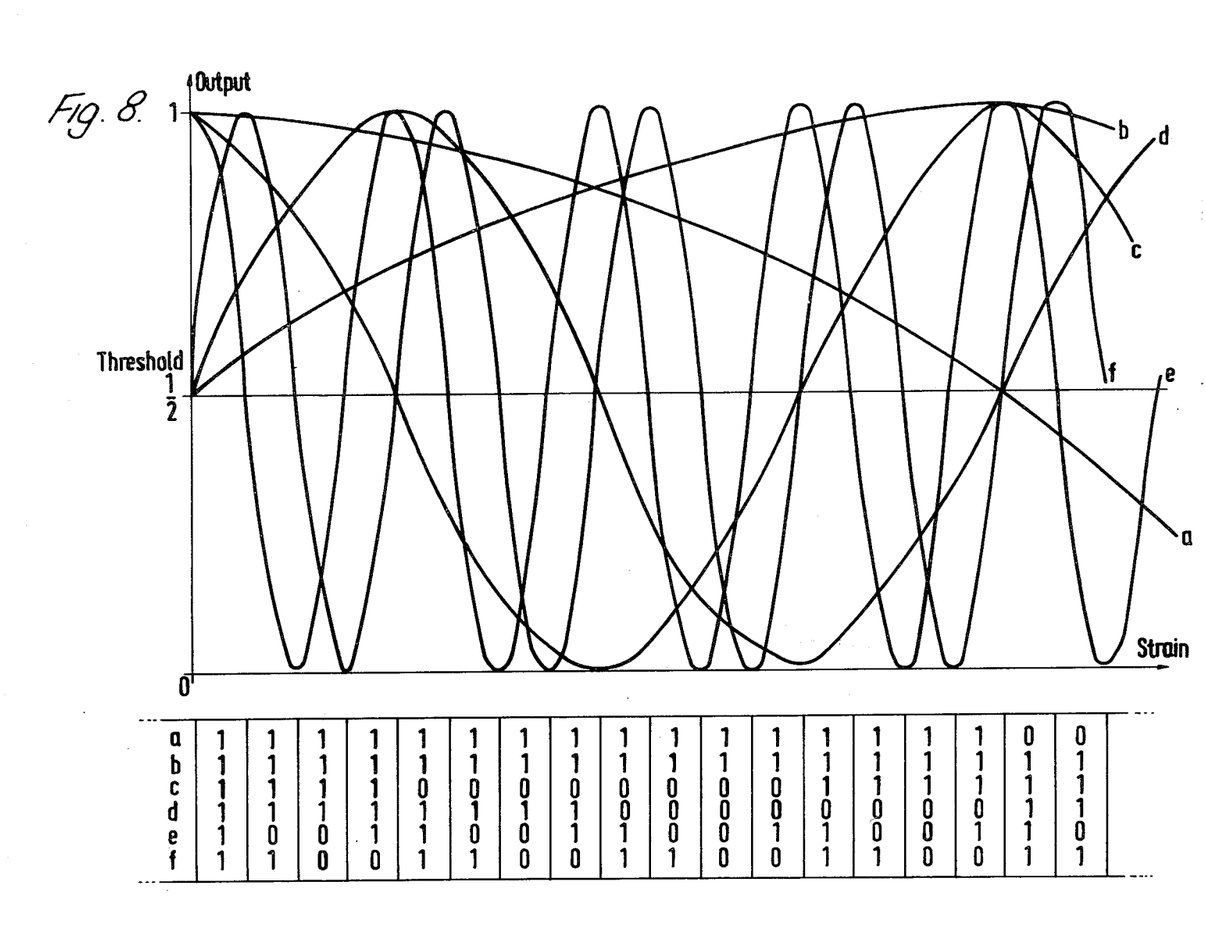

The outputs of each pair of photodetectors both vary sinusoidally with applied strain. The two sinusoids are in phase quadrature. FIG. 8 depicts the sinusoidal traces for the six photodetectors associated with 3 fibres having strained lengths L, 4L, and 16L respectively. The sinusoidal outputs associated with the fibres of length L and 4L have a pitch respectively a pitch sixteen times as great and four times as great as that associated with the fibre of length 16L.

Although FIG. 7 depicts separate light sources, polarisers, beam splitters, analysers, and quarter-waveplates for the individual fibres, it is to be understood that these integers can be commoned. Furthermore the polariser can be dispensed with if the light source is one that generates polarised light.

The output of each photodetector is taken to an associated threshhold switching device 76 which is arranged to switch at the median value of the photodetector output. These switching devices therefore generate a binary code that is set out beneath the graph of FIG. 8. Inspection of the binary code sequence produced by increasing strain reveals that it changes at regular intervals and will repeat itself after a sequence of 64 codes. Inspection also reveals that the addition of each extra fibre quadruples the length of the sequence.

For the sake of illustrative clarity only three fibres have been depicted in FIG. 7, whereas in general such a sensor will have more than 3 fibres in order to provide greater resolution in the digital read-out of the sensor.

One particular application for the sensors of FIGS. 5 and 7 lies in the measurement of pressure in a jet engine. Typically for this sort of application a resolution of 1 in $10^4$ is required, and this can be provided by 14 fibres using the arrangement of FIG. 5 or 7 fibres in the case of a FIG. 7 type arrangement. Temperature effects in the fibres will be negligible, since, to a first order approximation, any increase in fibre length due to thermal expansion is matched by a compensating decrease in refractive index which leaves the optical path length substantially invariant. Moreover the effect is similar for both planes of polarisation. Care has to be taken that temperature variations are not converted into pressure variations applying strain to the fibres, but this can be ensured by well known mechanical artefacts, and can be reduced to negligible proportions if a low expansion material, such as silica, is used throughout.

In a quite different application the thermal expansion of the strain member may be utilised to make the sensor into a temperature sensor rather than a pressure sensor.

It is to be understood that the foregoing description of specific examples of this invention is made by way of example only and is not to be considered as a limitation on its scope.

We claim:

1. A method of measuring the magnitude of strain in at least one optical fiber of circular symmetry comprising the steps of:
straining the fiber over a portion of its length in a direction perpendicular to the fiber axis;
propagating polarized light through the fiber while under strain;
monitoring the polarized light propagating through the fiber to determine the strain-induced difference in phase velocity of two orthogonal fundamental modes of the propagated light; wherein the strain is applied to one single fiber and wherein the strain induced phase velocity difference of the two orthogonal fundamental modes is measured by polarized light having components in and perpendicular to the strain direction into one end of the fiber and exiting the light from another end of the fiber; and
splitting the light emerging from the fiber into two components each of said components passing to an associated photodetector through an associated linear polarization analyzer having a polarization axis aligned at 45° to the strain direction wherein only one of said analyzers is prefaced with a quarter-waveplate with its optic axis aligned at 45° to the polarization axis of the analyzer.

2. The method of claim 1 wherein the polarised light propagates with a normalised frequency of less than 2.405.

3. The method of claim 1 including the step of using changes occuring at the outputs of the detectors to control the value of the count in a counter the value of the count being changed by one unit each time the output of a particular one of the counters passes through a median threshold value, increasing or decreasing the count according to whether the strain is increasing or decreasing as determined having regard to whether the magnitude of the output of the one detector is increasing or decreasing at the instant output of the other detector at the instant of the passage of the output of the one detector through the threshold decreasing as determined having regard firstly to whether the output is increasing or decreasing in its passage through the threshold value and secondly to the magnitude of the output of the other detector at the instant of said passage through the threshold value.

4. A method of measuring the magnitude of strain in at least one optical fiber of circular symmetry comprising the steps of straining the fiber over a portion of its length in a direction perpendicular to the fiber axis; propagating polarized light through the fiber while under strain; monitoring the polarized light propagating through the fiber to determine the strain-induced difference in phase velocity of two orthogonal fundamental modes of the propagated light; wherein the strain is applied to a set of fibers over portions of their length that are in harmonic relationship such that each strained length is twice the strained length of its predecessor in the set, and wherein the strain induced phase velocity difference of the two orthogonal fundamental modes is measured by directing polarized light having components in and perpendicular to the strain direction through each fiber, by directing the light emerging therefrom through a linear polarization analyzer, whose polarization axis is aligned at 45° to the strain direction, to an associated photodetector, and by deriving a coded binary representation of the magnitude of the applied strain by determining whether the individual detector outputs are above or beneath a median threshold value.

5. A method of measuring the magnitude of strain in at least one optical fiber of circular symmetry comprising the steps of straining the fiber over a portion of its length in a direction perpendicular to the fiber axis; propagating polarized light through the fiber while under strain; and monitoring the polarized light propagating through the fiber to determine the strain-induced difference in phase velocity of two orthogonal fundamental modes of the propagated light; wherein the strain is applied to a set of fibers over portions of their length that are in harmonic relationship such that each strained length is four times the strained length of its predecessor in the set, and wherein the strain induced phase velocity difference of the two orthogonal fundamental modes is measured by directing polarized light having components in and perpendicular to the strain direction through each fiber, by splitting the light emerging therefrom into two components each of which passes to an associated photodetector through an associated linear polarization analyzer whose polarization axis is aligned at 45° to the strain direction wherein only one of the two analyzers associated with each fiber is prefaced with a quarter-waveplate with its optic axis aligned at 45° to the polarization axis of the analyzer, and by deriving a coded binary digital representation of the magnitude of the applied strain by determining whether the individual detector outputs are above or beneath a median threshold value.

6. A strain sensor as claimed in claim 5 wherein the strain member is a hollow vessel.

7. A strain sensor including a light source, an optical fibre of circular symmetry wrapped around a strain member such that expansion of the strain member strains the wrapped around portion of the fibre in a direction perpendicular to its axis, a beam splitter, a quarter-waveplate, and a pair of photodetectors whose outputs are connected to a pair of threshold switching devices, wherein the light source is adapted to launch polarised light into one end of the fibre to excite two orthogonal fundamental modes propagating with a normalised frequency of less than 2.405, one mode having its polarisation direction aligned with the strain direction, wherein the other end of the fibre is positioned with respect to the beam splitter to divide the light that has propagated therethrough into a pair of beams which are directed to the photodetectors each beam reaching its photodetector via a linear polarisation analyser whose polarisation direction is inclined at 45° to the fibre strain direction and wherein a single one of the beams reaches its analyser via a quarter-waveplate oriented with its optic axis at 45° to the polarisation direction of the analyser.

8. A strain sensor as claimed in claim 7 wherein the optical fibre is made of silica.

9. A strain sensor including at least one light source, a set of optical fibres of circular symmetry and identical construction wrapped around a strain member such that expansion of the strain member strains the wrapped around portion of each fibre of the set in a direction perpendicular to its axis, one or more linear polarisation analysers, and a set of photodetectors each of whose outputs is connected to the input of an associated one of a set of threshold switching devices, wherein the individual lengths of the wrapped around portions of the set of fibres are harmonically related such that the wrapped around length of each fibre is twice the wrapped around length of its predecessor in the set of fibres, wherein the light source is adapted to launch polarised light into one end of each member of the set fibres to excite two orthogonal fundamental modes propagating with a normalised frequency of less than 2.405, one mode having its polarisation direction aligned with the strain direction, and wherein the other end of each member of the set of fibres is positioned to direct light that has propagated therethrough to an associated one of the set of photodetectors via the, or one of the, linear polarisation analysers oriented with its polarisation direction at 45° to the fibre strain direction.

10. A strain sensor including at least one light source, a set of optical fibres of circular symmetry and identical construction wrapped around a strain member such that expansion of the strain member strains the wrapped around portion of each fibre of the set in a direction perpendicular to its axis, at least one beam splitter, one or more quarter-waveplates, at least one linear polarisation analyser, and a set of photodetectors having a plurality of outputs each connected to the input of an associated one of a set of threshold switching devices, wherein the individual lengths of the wraped around portions of the set of fibres are harmonically related such that the wrapped around length of each fibre is four times the length of its predecessor in the set of fibres, wherein the light source or sources are adapted to launch polarised light into one end of each member of the set of fibres to excite two orthogonal fundamental modes propagating with a normalised frequency of less than 2.405, one mode having its polarisation direction aligned with the strain direction, wherein the other end of each member of the set of fibres is positioned with respect to the beam splitter to divide light that has propagated therethrough into a pair of beams directed to an associated pair of members of the set of photodetectors each beam reaching its photodetector via the linear polarisation analyser said analyser being oriented with its polarisation direction at 45° to the fibre strain direction and wherein the quarter-waveplate is disposed such that a single member of each pair of beams reaches its associated analyser via a quarter-waveplate oriented with the optic axis aligned at 45° to the polarisation direction of the analyser.

* * * * *